United States Patent [19]
Kawai et al.

[11] Patent Number: 5,986,789
[45] Date of Patent: Nov. 16, 1999

[54] OPTICAL TRANSMISSION LINE AND OPTICAL TRANSMISSION SYSTEM

[75] Inventors: Shingo Kawai, Yokosuka; Kenichi Suzuki; Katsumi Iwatsuki, both of Yokohama, all of Japan

[73] Assignee: Nippon Telegraph and Telephone Corporation, Tokyo, Japan

[21] Appl. No.: 08/812,158

[22] Filed: Mar. 6, 1997

[30] Foreign Application Priority Data

Mar. 7, 1996 [JP] Japan ................................. 8-049750

[51] Int. Cl.⁶ .......................... H04B 10/18; H04B 10/12
[52] U.S. Cl. ......................... 359/173; 359/161; 359/179
[58] Field of Search .................................. 359/110, 161, 359/173, 177, 179, 188, 195

[56] References Cited

U.S. PATENT DOCUMENTS

| | | | |
|---|---|---|---|
| 5,140,656 | 8/1992 | Hasegawa et al. | 359/173 |
| 5,357,364 | 10/1994 | Gordon et al. | 359/173 |
| 5,463,489 | 10/1995 | Mamyshev et al. | 359/173 |
| 5,557,441 | 9/1996 | Mollenauer | 359/173 |
| 5,786,918 | 7/1998 | Suzuki et al. | 359/173 |
| 5,801,862 | 9/1998 | Desurvire et al. | 359/173 |

OTHER PUBLICATIONS

S. Kawai et al., "Ultra–high speed long distance nonlinear waveform reshaping transmission using adiabatic solution compression and narrowband sliding–frequency filter", Electronics Letters, 32(23):2170–217 1 Nov. 7, 1996.

K. Iwatsuki et al., "Timing Jitter Due to Carrier Linewidth of Laser–Diode Pulse Sources in Ultra–High Speed Soliton Transmission", Journal of Lightwave Technology, 13(4):639–649 Apr. 4, 1995.

A. Stentz, "Dramatically improved transmission of ultrashort solitons through 40km of dispersion–decreasing fiber", Optics Letters, 20(17):1770–1771 Sep. 1, 1995.

K. Suzuki et al., "Optical Filtering Technique for Suppressing Nonlinear Pulse Distortion caused by Long Transmission Distance", OAA FB3, pp. 136–139 (1995).

P. Manyshev et al., "Generation of Fundamental Soliton Trains for High–Bit–Rate Optical Fiber Communication Lines", Journal of Quantum Electronics, 27(10):2347–2355 Oct. 1991.

B. Désormiére et al., "An Integrated Optic Frequency Translator for Microwave Lightwave Systems", Journal of Lightwave Technology, 8(4):506–513 Apr., 4, 1990.

S. Kawai et al., "Ultra–high Speed Long Distance Nonlinear Waveform Reshaping Transmission Using Adiabatic Soliton Compression and Narrow–band sliding–frequency Filter", OECC Technical Digest, pp. 32–33 Jul. (1996).

A. Hasegawa et al., "Solitons in Optical Communications", Oxford University Press, (an extract) pp. 226–242 (1995).

*Primary Examiner*—Leslie Pascal
*Attorney, Agent, or Firm*—Finnegan, Henderson, Farabow, Garrett & Dunner, L.L.P.

[57] ABSTRACT

An optical transmission line formed by a plurality of transmission circuits each comprising, connected in the following order, an optical fiber, an optical amplifier and an optical filter. The dispersion decrease in each optical fiber and the amplification of each optical amplifier are set for each transmission circuit such as to obtain a predetermined optical pulse width, the central frequencies of the optical filters are made to sequentially slide toward lower frequencies along the direction of propagation, and the mean zero-dispersion wavelengths of the optical fibers are made to sequentially increase along the direction of propagation. An optical transmission system according to the present invention is formed from an optical transmission line according to the present invention, an optical transmitter and an optical receiver.

13 Claims, 12 Drawing Sheets

OPTICAL TRANSMISSION LINE AND OPTICAL TRANSMISSION SYSTEM

BACKGROUND OF THE INVENTION

1. Technical Field of the Invention

The present invention relates to optical transmission lines and optical transmission systems for reducing timing jitter by suppressing optical pulse waveform degradation due to nonlinearity, dispersion and higher-order dispersion of optical fibers in ultra-high-speed optical transmissions.

2. Background Art

In ultra-high-speed optical transmissions which require short optical pulses of a few picoseconds or less, nonlinearity, dispersion and higher-order dispersion in the optical fibers causes the optical pulse waveforms to markedly degrade. Pulse waveform degradation which is due to the effects of higher-order dispersion and nonlinearity occurs because a large portion of the optical spectrum shifts to lower frequencies when the dispersion in the optical fiber is zero or extremely small. This type of pulse waveform degradation forces the transmission distance to be restricted. As a conventional method of compensating for waveform degradation due to nonlinearity and dispersion, there is a method wherein long-distance transmissions are performed by using a special type of optical pulse, called an optical soliton, which can propagate through an optical fiber while maintaining the shape of the waveform by balancing out the dispersion and nonlinearity.

When actually forming an optical soliton transmission system, amplified spontaneous emission noise (ASE) emitted from optical amplifiers used to compensate for loss in the optical fibers causes random changes in the carrier frequencies of the optical solitons. These changes are referred to as the Gordon-Haus effect (see Reference 1: A. Hasegawa et al., "Solitons in Optical Communications", Oxford Univ. Press, 1995), and are known to cause fluctuations in the propagation time of each optical soliton in the optical fiber, thus causing timing jitter. Additionally, the carrier linewidth of the optical soliton source also causes timing jitter in a similar process (see Reference 2: K. Iwatsuki et al., *IEEE J. Lightwave Technol.*, 13, pp. 639–649, 1995).

Therefore, since the timing jitter in optical soliton transmissions restricts the transmission speed or transmission distance, methods have been proposed for reducing the timing jitter by using optical filters having central frequencies which are slid in correspondence with the transmission distance, optical filters and intensity modulators, and the like, and optical soliton transmissions at transmission speeds of approximately 20 Gb/s have been confirmed by recirculating loop experiments (see Reference 1). However, in the above-described conventional methods, the bandwidths of the optical filters must be about 4–5 times those of the signal spectra in order to preserve the waveforms, and optical filters with narrower bandwidths cannot be used.

Since timing jitter accumulation increases with increases in the transmission speed, more effective reduction of timing jitter is a significant step in realizing ultra-high-speed optical soliton transmissions exceeding a few tens of Gb/s. Additionally, in optical soliton transmissions, the spacing between the positions of the optical amplifier and the above-mentioned optical filter, intensity modulators and the like must be made sufficiently short with respect to the soliton period defined by the optical soliton pulsewidth and the mean dispersion value of the optical fiber, so that if the soliton period is shortened for increased transmission speed, the amplifier spacing cannot be maintained at a practical length.

A method of using a dispersion decreasing fiber (DDF) wherein the dispersion value decreases like the attenuation of the optical power for the transmission path has been proposed as a solution to the above-mentioned problem of the amplifier spacing (see Reference 3: A. J. Stentz et al., *Opt. Lett.*, 20, pp. 1770–1772, 1995). In a series of DDFS, the amplifier spacing can be maintained by designing the length and dispersion distribution of the DDF such that optical solitons having periods of a few picoseconds or less can be made to propagate while retaining their waveforms due to a localized balancing of the nonlinearity and dispersion.

On the other hand, when performing long-distance transmissions using conventional DDFS as described above, the dispersion value of the DDF near the output end becomes small if the mean dispersion value is reduced to account for the accumulation of timing jitter, as a result of which the pulse waveform degrades under the influence of higher-order dispersion and nonlinearity (see Reference 4: K. Suzuki et al., *OAA'* 95 FB3, 1995) so as to restrict the transmission distance. As mentioned above, when the dispersion of the optical fiber is either zero or extremely small, the degradation of the pulse waveform due to higher-order dispersion and nonlinearity occurs because a large portion of the optical spectrum shifts to lower frequencies. No specific solutions to this type of waveform degradation have heretofore been proposed. Additionally, while timing jitter also occurs in methods using DDFs as transmission lines due to the application of optical soliton effects, no methods have been conventionally proposed for effectively reducing timing jitter in this case as well.

SUMMARY OF THE INVENTION

The object of the present invention is to offer an optical transmission line and optical transmission system which suppress optical pulse waveform degradation due to nonlinearity, dispersion and higher-order dispersion in optical fibers which occurs in ultra-high-speed optical transmissions on the order of tens of Gb/s or more.

In order to resolve the above problems, the present invention offers an optical transmission line comprising a plurality of transmission circuits each having, connected in the following order, an optical fiber with a dispersion value that decreases in the longitudinal direction, an optical amplifier, and an optical filter; wherein the dispersion decrease in each fiber and the amplification of each optical amplifier is set for each of the transmission circuits such as to result in a predetermined optical pulse width; the central frequencies of the optical filters are made to sequentially slide toward lower frequencies along the direction of propagation; and the mean zero-dispersion wavelengths of the optical fibers are made to sequentially increase in the direction of propagation.

Another aspect of the present invention offers an optical transmission line comprising a plurality of transmission circuits each having, connected in the following order, an optical fiber with a dispersion value that decreases in the longitudinal direction, an optical amplifier, an optical frequency shifter, and an optical filter; wherein the dispersion decrease in each fiber and the amplification of each optical amplifier is set for each of the transmission circuits such as to result in a predetermined optical pulse width; and the optical spectra of the optical signals outputted from each of the plurality of optical frequency shifters are shifted to higher frequencies than the optical spectra of the optical signals when inputted.

Another aspect of the present invention offers an optical transmission line comprising a plurality of transmission circuits each having, connected in the following order, an optical fiber which is a distributed optical amplifier having a gain in the direction of propagation, and an optical filter; wherein the central frequencies of the optical filters are made to sequentially slide toward lower frequencies along the direction of propagation; and the mean zero-dispersion wavelengths of the optical fibers are made to sequentially increase in the direction of propagation.

Another aspect of the present invention offers an optical transmission line comprising a plurality of transmission circuits each having, connected in the following order, an optical fiber which is a distributed optical amplifier having a gain in the direction of propagation, an optical frequency shifter, and an optical filter; wherein the amplification of each optical amplifier is set for each of the transmission circuits such as to result in a predetermined optical pulse width; the optical spectra of the optical signals outputted from each of the plurality of optical frequency shifters are shifted to higher frequencies than the optical spectra of the optical signals when inputted.

Another aspect of the present invention offers an optical transmission system comprising an optical transmitter; an optical transmission line in accordance with an aspect of the present invention connected to the optical transmitter; and an optical receiver connected to the optical transmission line.

In an aspect of the optical transmission line of the present invention, adiabatic soliton compression can be performed by gradually reducing the dispersion value in the longitudinal direction using optical fibers. In another aspect, adiabatic soliton compression can be performed by increasing the amplification of the optical amplifiers in the direction of propagation using optical fibers which are distributed amplifiers having gains in the direction of propagation. Additionally, in the above two aspects, it is possible to perform pulse compression by making the input power to the optical fibers greater than the optical power of the fundamental solitons. Additionally, it is also possible to reshape waveforms by sliding (up-sliding) the optical frequencies to higher frequencies using optical filters with fixed central frequencies and frequency shifters instead of making the central frequencies of the optical filters slide downward.

According to the present invention, waveform degradation of optical pulses due to nonlinearity, dispersion and higher-order dispersion in optical fibers can be suppressed, and timing jitter caused by the use of optical soliton effects can be largely reduced, so as to allow the transmission distance to be increased.

PREFERRED EMBODIMENTS OF THE INVENTION

Hereinbelow, embodiments of the present invention will be explained in detail with reference to the drawings.

Figure 1:
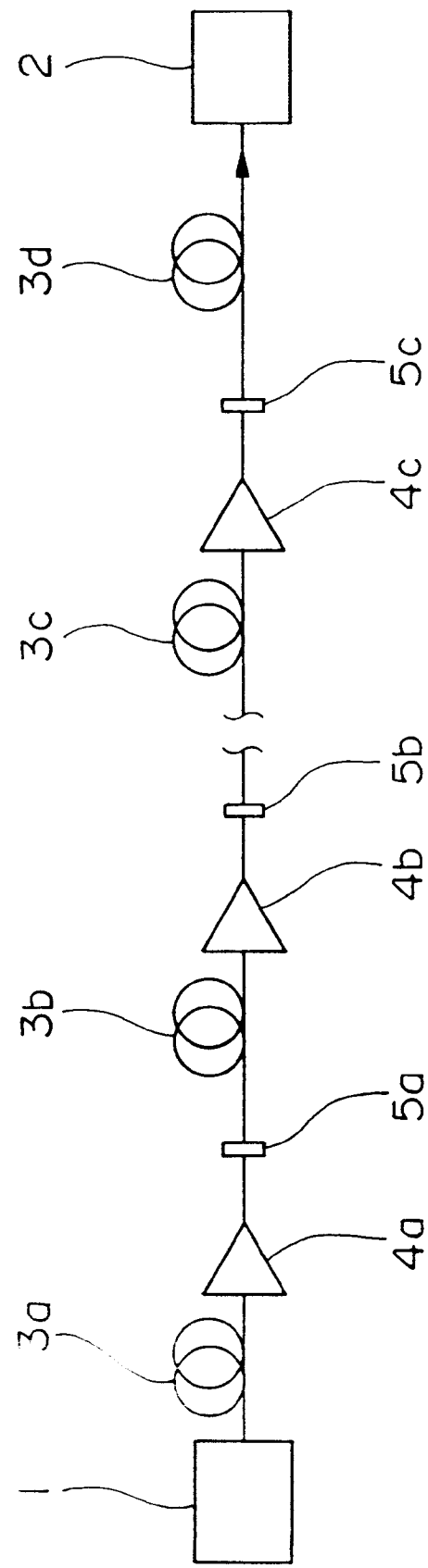
FIG. 1 is a diagram for explaining a first embodiment of the present invention.

FIG. 1 is a diagram showing a multiply amplified optical transmission system using an optical transmission line according to the first embodiment of the present invention. This multiply amplified optical transmission system comprises dispersion decreasing fibers (DDFs) 3a–3d for transmission used on the optical paths from the optical pulse transmitter 1 to the optical receiver 2, amplified at predetermined amplifier spacings by groups of optical amplifiers 4a–4c and narrow-band optical filters 5a–5c. As the optical amplifiers 4a–4c, it is possible to use optical amplifiers provided with control such that the power of the output from the optical filter is made equal to the initial input power to the fiber (ALC control).

The multiplly amplified optical transmission system of the present embodiment is constructed by concatenously connecting a plurality of optical transmission lines composed of DDFs 3a–3d, optical amplifiers 4a–4c and optical filters 5a–5c connected in this order. The decrease in the dispersion value along the longitudinal direction of the DDFs 3a–3d is adjusted such as to be larger than the attenuation of the optical power. The central frequencies of the optical filters 5a–5c are slid down in correspondence with the transmission distance. Additionally, the mean zero-dispersion wavelength of the concatenously connected DDFs 3a–3d are sequentially increased along with the transmission distance. By using this type of transmission format, waveform degradation of the optical pulses due to higher order dispersion and nonlinearity can be suppressed, while markedly reducing timing jitter caused by the use of the optical soliton effect, thereby making it possible to increase the transmission distance.

In the optical transmission line of the present embodiment, the DDFs 3a–3d are adjusted so that the dispersion value decreases are greater than the attenuation of the optical power. Thus, the optical pulses are compressed in a single DDF by means of adiabatic soliton compression (see Reference 5: P. V. Manyshev et al., *IEEE J. Quantum Electron.*, vol. 27, no. 10, p. 2347, 1991), the spectral widths are broadened, then the optical spectra are bandwidth-limited using narrow-band optical filters 5a–5c which have been slid (down-slid) to lower frequencies than the central frequencies of the incident optical pulses, in order to reshape the waveforms. As a result, optical pulse degradation caused by nonlinearity and higher-order dispersion in optical fibers can be suppressed. Additionally, by bandwidth-limiting the spectra of the optical pulses using the narrow-band optical filters 5a–5c, it is possible to largely reduce timing jitter cause by the use of the optical soliton effect.

Figure 2A:
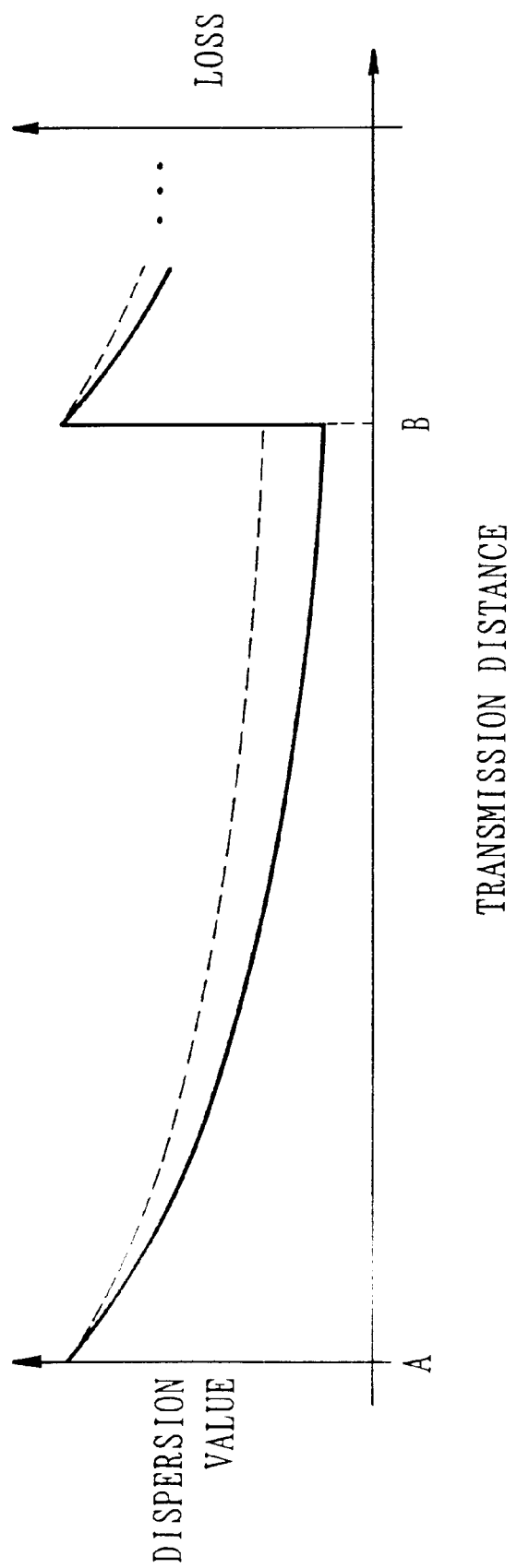
FIG. 2A is a diagram for explaining the relationship of the dispersion value and loss with respect to transmission distance in an amplifier spacing according to the embodiment of FIG. 1.
Figure 2B:
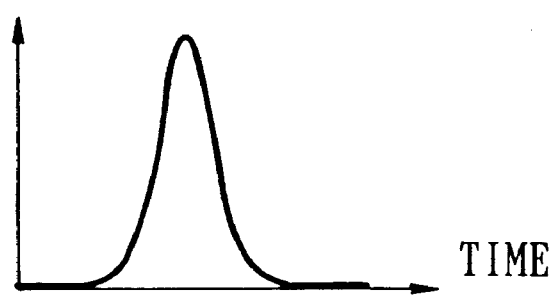
FIGS. 2B–2D are diagrams respectively showing the time-varying waveform of an optical pulse signal at the input end of the DDF, the output end of the optical amplifier and the output end of the optical filter.
Figure 2C:
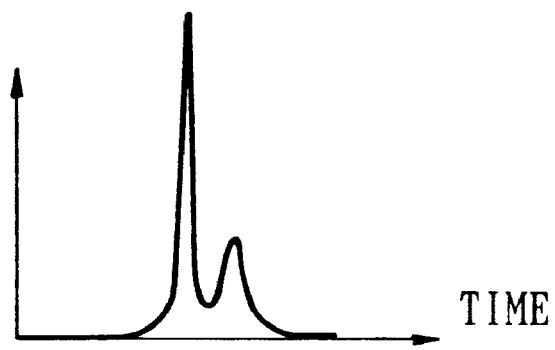
Figure 2D:
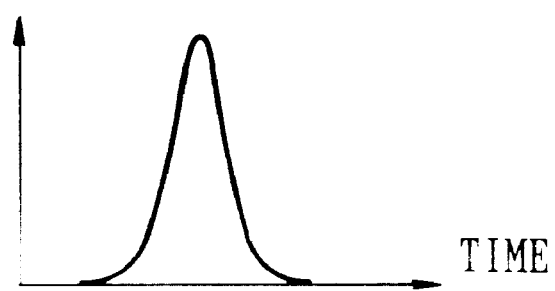
Figure 2E:
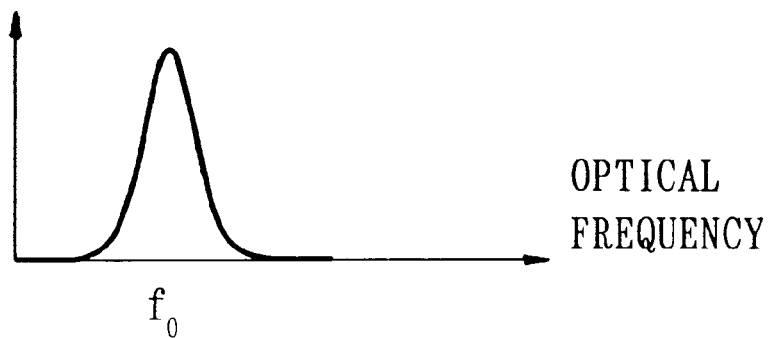
FIGS. 2E–2G are diagrams respectively showing the optical spectrum of an optical pulse signal at the input end of the DDF, the output end of the optical amplifier and the output end of the optical filter.
Figure 2F:
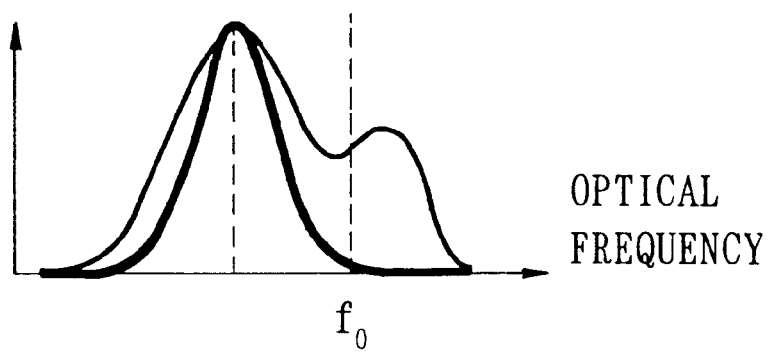
Figure 2G:
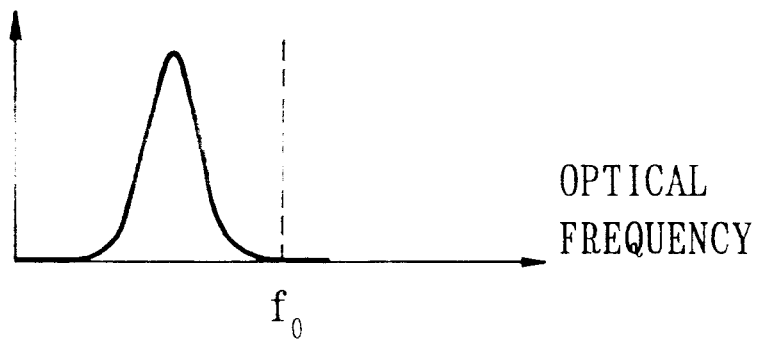

FIG. 2A is a diagram showing the changes in the dispersion value (solid line) and the optical power decrease, i.e. loss (dashed line) in an optical transmission line including transmission distance A (the position of the optical amplifier 4a) and transmission distance B (the position of the optical amplifier 4b) in the transmission system shown in FIG. 1. The optical pulse signals amplified by the amplifier 4a at transmission distance A are bandwidth-limited by means of the optical filter 5a having a predetermined central frequency $f_0$ and are reshaped into the pulse waveforms which vary over time as shown in FIG. 2B, then they are outputted to DDF 3b. At this time, the optical spectrum of the optical signal is centered about the frequency $f_0$ as shown in FIG. 2E. The optical pulses which pass through the DDF 3b adjusted such that dispersion value decreases in a single DDF are greater than the optical power attenuation have their optical pulsewidths compressed due to adiabatic soliton compression, and their spectral widths are broadened, so that they have time-varying waveforms and optical spectra as shown in FIGS. 2C and 2F at the output end of the optical amplifier 4b. As shown in FIG. 2F, the optical spectra are divided due to nonlinearity and higher-order dispersion in the optical fiber and shifted to lower frequencies. The optical pulse signals outputted from the optical amplifier 4b have central frequencies which are slid (down-slid) to lower frequencies than the central frequencies $f_0$ of the incident optical pulses, and their optical spectra are bandwidth-limited by means of the narrow-band optical filter 5b which has a bandwidth 1–2 times the bandwidths of the incident optical pulses (FIG. 2F), so as to reshape the waveform. As a result, only the main portions of the optical spectra which have been divided and shifted to lower frequencies due to nonlinearity and higher-order dispersion in the optical fiber are passed, and the dispersive waves shifted to higher frequencies are removed so as to suppress optical pulse waveform degradation. The waveforms immediately after passing through the narrow-band optical filter 5b have time variances and optical spectra as shown in FIGS. 2D and 2G.

In the above-described conventional technique which uses optical filters with central frequencies which slide with the transmission distance, the direction of sliding of the frequency is arbitrary because the purpose is to eliminate noise components such as ASE. In contrast, the direction of sliding of the frequency is not arbitrary in the present invention because the purpose is to reshape waveforms which have degraded due to nonlinearity and higher-order dispersion. In the present invention, the optical pulses are passed through the narrow-band filter after significantly increasing the optical spectrum width by means of adiabatic soliton compression, so that the signal bandwidth will not be reduced by the optical filters, thereby allowing the optical filters to have bandwidths about as narrow as the optical signal spectra. By using this type of narrow-band optical filter, it is possible to largely reduce the timing jitter in comparison to conventional methods in which the optical filters can only be as narrow as approximately 4–5 times the optical signal spectra.

Here, adiabatic soliton compression will be explained. adiabatic soliton compression is performed by decreasing the dispersion value D along the direction of propagation using a DDF while maintaining optical soliton conditions (pulse energy ($\epsilon$)×pulse width ($\Delta\tau$) dispersion (D)) and the condition $|\alpha z_0|<<1$ (wherein $\alpha$ is the gain coefficient and $Z_0$ is the soliton period). Since the optical soliton conditions are met when $\Delta\tau$ D/$\epsilon$, the pulsewidth $\Delta\tau$ can be compressed by means of adiabatic soliton compression if the decrease in dispersion D is large in comparison to the attenuation of the pulse energy $\epsilon$.

In the above explanation, it was mentioned that adiabatic soliton compression is performed by gradually decreasing the dispersion D in the longitudinal direction using a DDF. However, as is clear from the soliton conditions, adiabatic soliton compression can also be performed by gradually increasing the degree of optical amplification in the longitudinal direction using a distributed optical amplifying fiber instead of the DDF as the optical fiber as will be explained in detail below.

Additionally, aside from adiabatic soliton compression, pulse compression can be performed by making the optical power greater than the soliton power $P_0$.

Hence, optical pulse compression can be performed by forming the transmission line such as to satisfy one of the following conditions:

(1) The dispersion decrease is greater than the optical fiber loss (optical power amplification) (adiabatic soliton compression).

(2) The input optical power to the fiber is greater than the soliton power (soliton compression).

(3) The degree of amplification inside each DDF increases along the direction of propagation (adiabatic soliton compression).

Figure 2H:
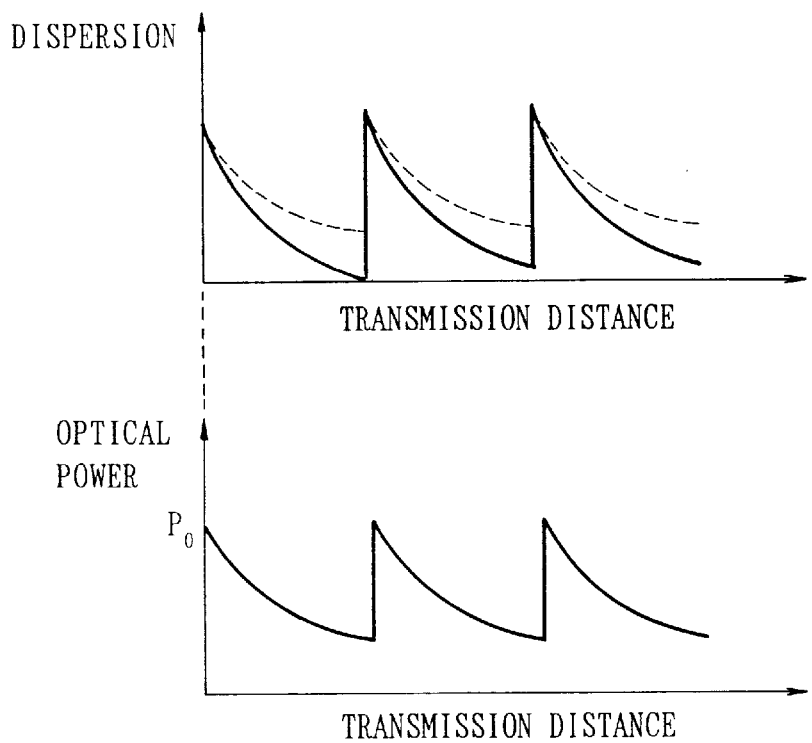
FIGS. 2H–2K are diagrams for explaining optical pulse compression conditions.
Figure 2I:
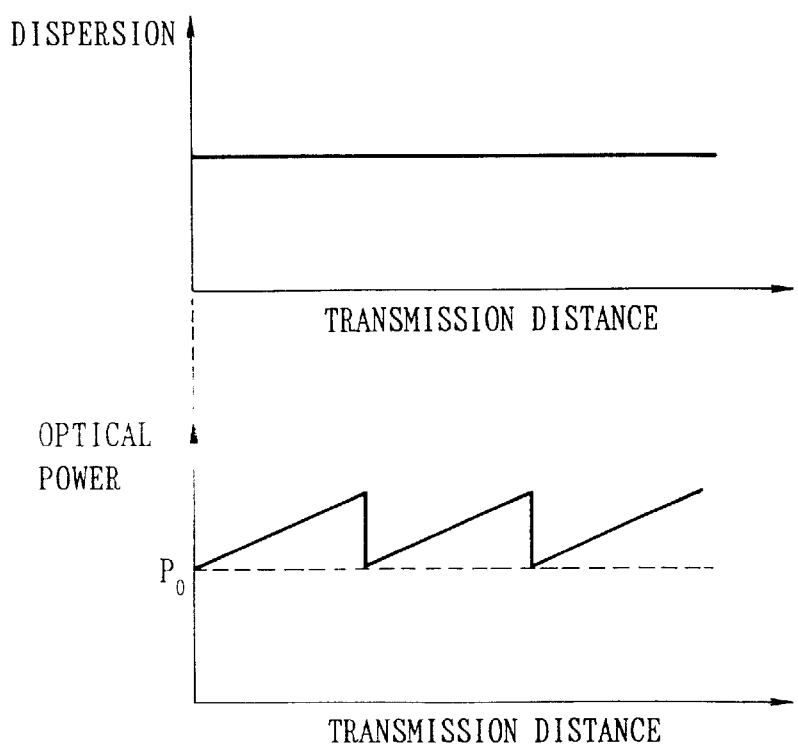
Figure 2J:
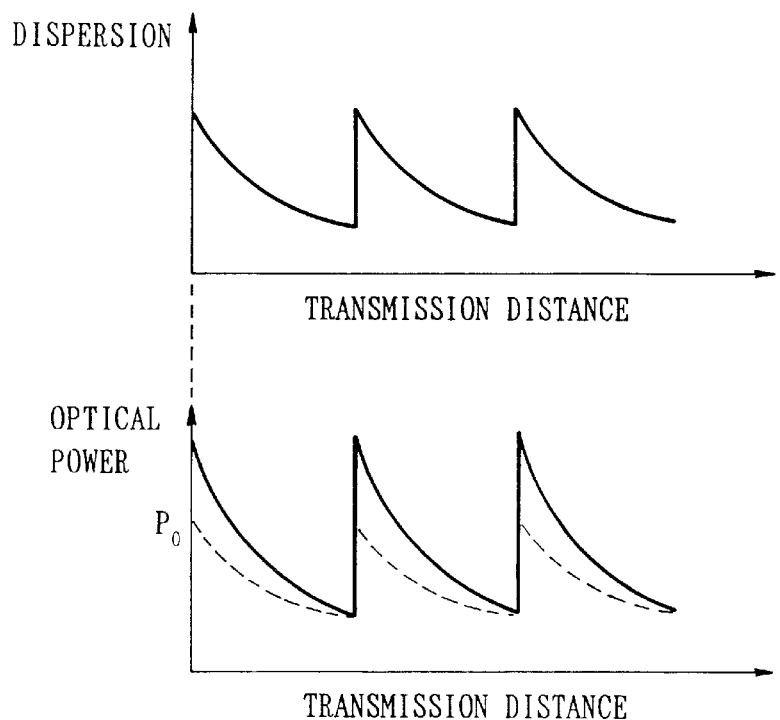
Figure 2K:
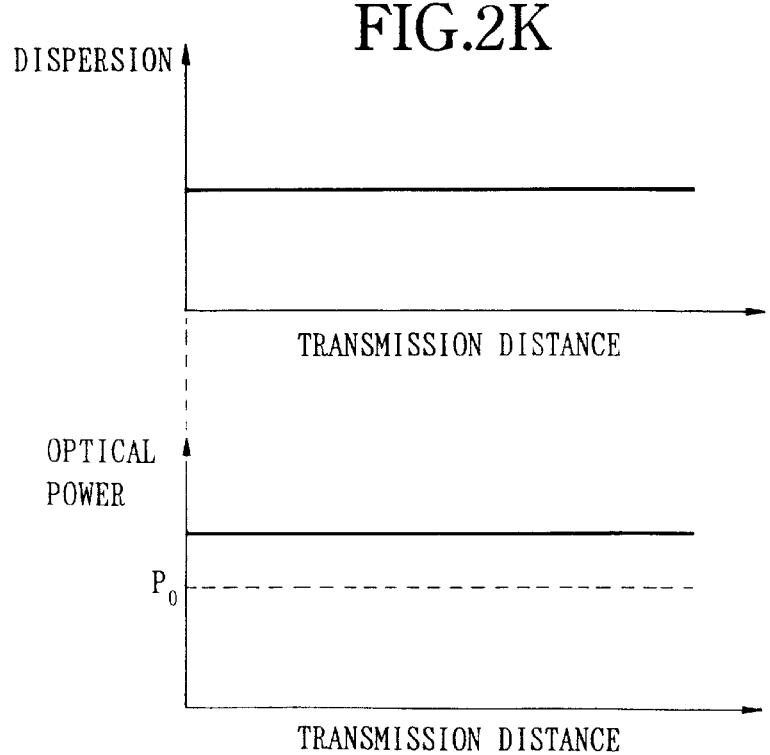

FIGS. 2H–2K are diagrams showing these conditions. FIG. 2H shows the case wherein the dispersion decrease is made greater than the power decrease using a DDF. FIG. 2I shows the case wherein the amplification in the longitudinal direction is increased using a distributed amplifier. In these cases, optical pulse compression is performed by means of adiabatic soliton compression while holding the input power to the fiber at less than or equal to the soliton power $P_0$. In the diagram, the properties indicated by the dashed lines are those for the case wherein the optical pulse width is held constant. On the other hand, FIGS. 2J and 2K show cases wherein optical pulse compression is performed by making the input power to the fiber greater than the soliton power $P_0$, of which FIG. 2J is an example using a DDF, and FIG. 2K is an example using a distributed amplifier.

While the central frequencies of the narrow-band optical filters 5a–5c are down-slid in the embodiment shown in FIG. 1, as will be explained in the following embodiments, waveform reshaping is also possible by sliding the optical frequency to higher frequencies (up-sliding) using optical filters with fixed central frequencies and frequency shifters, instead of down-sliding the central frequencies of the narrow-band optical filters 5a–5c.

The conventional technique using DDFs as mentioned above is characterized in that the optical pulse waveform is preserved due to the dispersion value of the DDF decreasing with optical power attenuation, which is substantially different from the transmission method of the present invention wherein waveform reshaping of the optical pulses is performed.

Here, the specific conditions for pulse width compression in the embodiment of FIG. 1 will be explained. When performing pulse compression, the dispersion decrease of each DDF and the amplification of each optical amplifier should be set so as to satisfy at least one of the following conditions (I) and (II) so as to decrease the pulse width of the optical signal outputted from each DDF to less than the pulse width at the input, and to increase the spectral width of the optical signal outputted from the DDF to be greater than the spectral width at the input.

(I) The dispersion decrease in the optical fiber is made greater than the power attenuation of the optical signal propagating through the optical fiber (adiabatic soliton compression).

(II) The peak power $P_0$ of the optical signal inputted to the optical fiber should be greater than the peak optical power (the optical power required to form a fundamental soliton: the soliton power) defined as follows:

$$P_0 = 0.776(\lambda^3 A_{eff}/\pi^2 c n_2) D/\tau^2$$

wherein $\lambda$ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and $\tau$ is the pulse width of the optical signal.

When only the condition (I) is to be fulfilled, the power of the optical signal inputted to the optical fiber should be made equal to the peak optical power expressed by the peak power $P_0$ of the above formula. On the other hand, when only the condition (II) is to be fulfilled, the dispersion decrease in the optical fiber should be made equal to the power attenuation of the optical signals propagating through the optical fiber.

As methods for forming the DDFs, it is possible to form each DDF by using optical fibers made such that the dispersion value gradually decreases, or by connecting together a plurality of optical fibers having different dispersion values such that the dispersion value gradually decreases in the direction of propagation.

The amplifications of the optical amplifiers 4a–4c change according to the order of the optical solitons. For example, when transmitting a fundamental soliton wherein N=1, it is possible to obtain a value of 1–2.25 in terms of power ratio, and an amplification factor of about two is desirable.

Hereinbelow, the waveform reshaping effect of the present invention will be explained.

Figure 3:
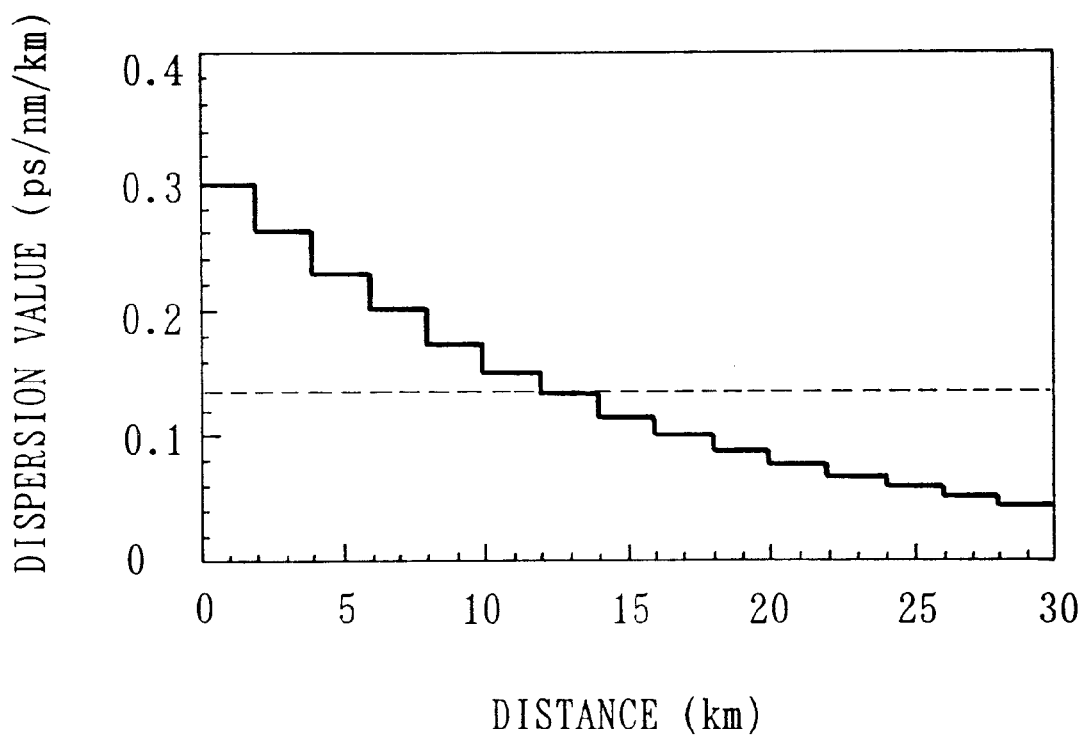
FIG. 3 is a diagram showing the dispersion values inside a DDF in the present invention.
Figure 4A:
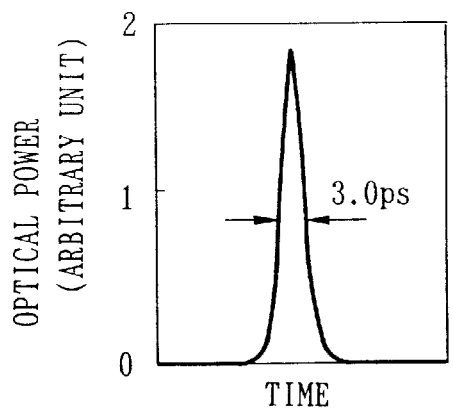
FIG. 4A is an initial waveform diagram for explaining the effects of the present invention.
Figure 4B:
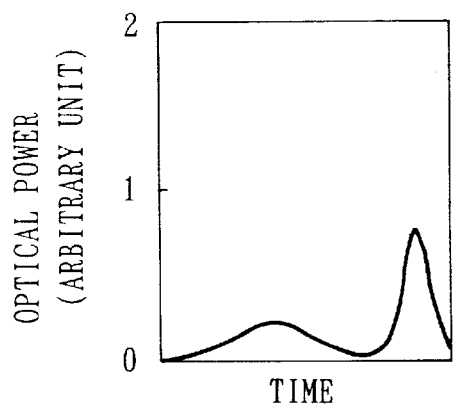
FIG. 4B is a waveform diagram after propagation over 300 km in the case wherein the central frequencies of the optical filters are not slid.
Figure 4C:
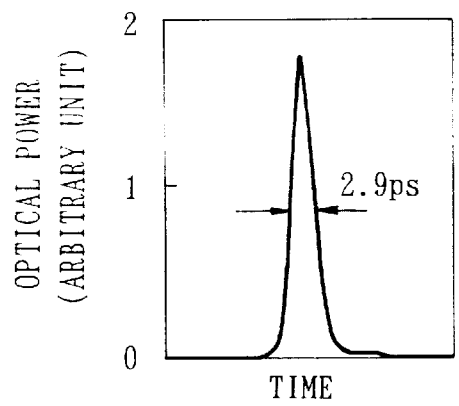
FIG. 4C is a waveform diagram after propagation over 300 km for the case wherein the central frequencies of the optical filters are down-slid by 7.0 GHz every 30 km.

First, numerical values calculated for the properties in the propagation of a single optical pulse having a pulse width of 3.0 ps will be given. The parameters are such that the fiber loss is 0.22 dB/km and the higher-order dispersion is 0.07 ps/nm²/km. The dispersion value of each 30 km DDF changes in steps as shown in FIG. 3, and the bandwidths of the optical filters is 1.5 nm. The input optical power is adjusted such as to be equal to the optical power of the N=1.4 soliton with respect to the above-mentioned pulse width and the initial dispersion value of the DDF. FIG. 4B shows a waveform after propagating 300 km in the case wherein the central frequencies of the optical filters are not slid. FIG. 4C shows a waveform after propagating 300 km in the case wherein the central frequencies of the optical filters are down-slid by 10.0 GHz every 30 km. The mean zero-dispersion wavelengths of each DDF are made to increase with the transmission distance so that the dispersion value at the central frequency of each optical pulse propagating along each DDF will not change. It can be seen that the degradation of the pulse waveform is effectively suppressed by down-sliding the central frequencies of the optical filters.

Figure 5A:
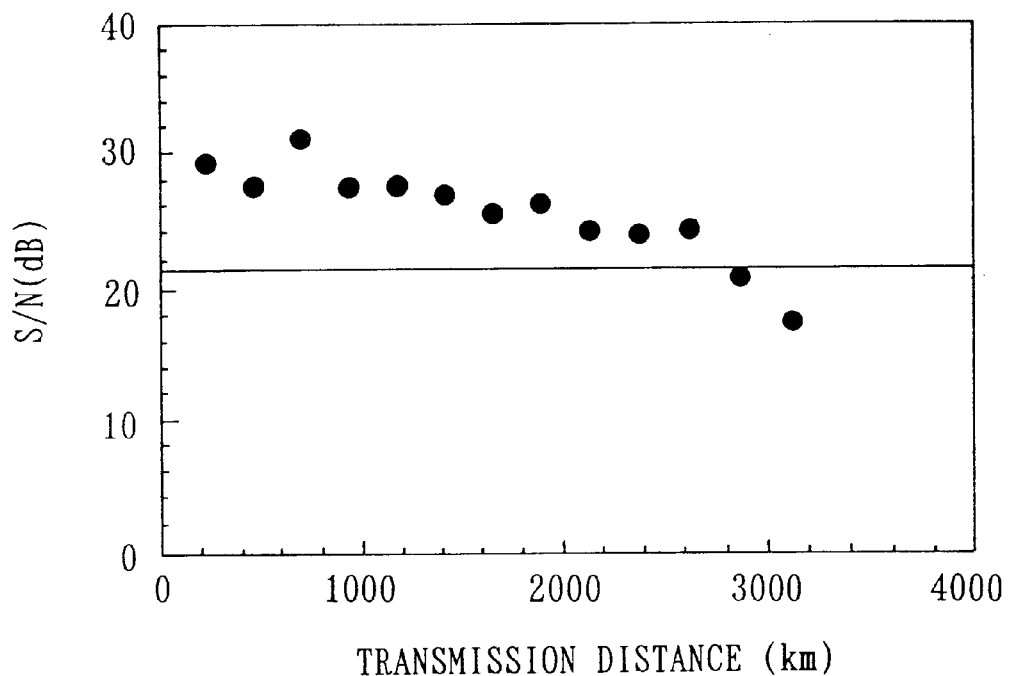
FIG. 5A is a diagram showing the relationship between transmission distance and S/N ratio for nonlinear transmissions according to the present invention.
Figure 5B:
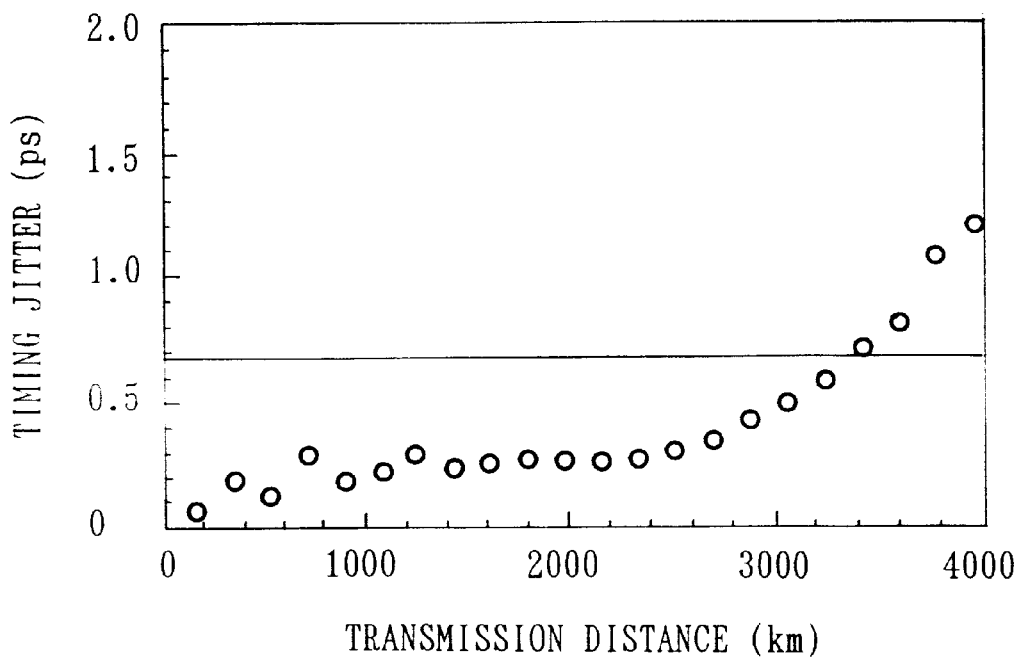
FIG. 5B is a diagram showing the relationship between transmission distance and timing jitter for nonlinear transmissions according to the present invention.

Next, the results will be explained for the case wherein a pulse sequence having a random pattern superimposed with ASE noise is transmitted at a speed of 80 Gb/s. The population inversion factor of the optical amplifier is 1.8, and the optical amplifier is controlled (ALC) such that the output from the optical filter is made equal to the initial input power to the fiber. The pulse width is 4.0 ps, an optical fiber having a pulse width of 1.7 nm is used, and the central frequencies are down-slid by 7.0 GHz every 30 km. FIGS. 5A and 5B show the relationships of the S/N ratio and timing jitter with respect to transmission distance. Since the optical pulse is compressed to 2.2 ps at the output end of the DDF, the bandwidth of the optical filter is 1.5 times the spectral width of the optical pulse. When considering that the relationship between the bandwidth of an optical filter for reducing timing jitter and the spectral width must be restricted to about 4–5 times in order to preserve the stability of the optical soliton (see Reference 1), the function of the optical filter in the present invention is substantially different from the function of optical filters used to reduce timing jitter. The values for the S/N ratio and timing jitter which result in a bit error rate of $10^{-9}$ are respectively 21.5 dB and 0.68 ps, and as can be seen from FIGS. 5A and 5B, the transmission distance which results in a bit error rate of $10^{-9}$ is 2760 km.

Figure 6:
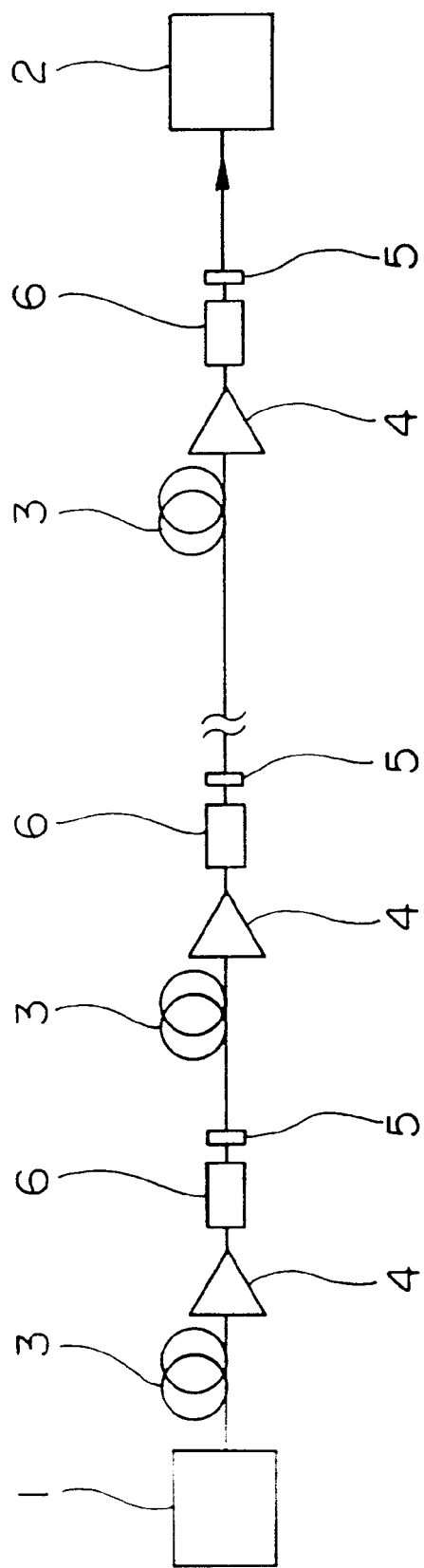
FIG. 6 is a diagram for explaining a second embodiment according to the present invention.

FIG. 6 is a diagram for explaining a second embodiment of the present invention, wherein each transmission circuit is formed by connecting, in the following order, a DDF 3, an optical amplifier 4, an optical frequency shifter 6 composed of acousto-optic modulators and the like, and an optical filter 5, and a multiply amplified transmission system is formed by connecting these transmission circuits in multiple stages. While the central frequencies of the optical filters 5a–5c are down-slid along with the transmission distance in the example of FIG. 1, the present embodiment is different in that the frequencies are up-slid by using optical filters 5 with fixed central frequencies and optical frequency shifters 6 composed of acousto-optic modulators for shifting the frequencies to higher frequencies. However, the embodiments are similar in that waveform degradation of the optical pulses due to higher-order dispersion and nonlinearity is suppressed, and timing jitter due to the optical soliton effect is largely reduced, so as to allow the transmission distance to be increased.

In the present embodiment, the frequencies are slid by using optical filters 5 with fixed central frequencies and optical frequency shifters 6, because the central frequencies of the transmitted optical pulses are fixed by the optical filters 5 and are constant with respect to transmission distance. Therefore, the dispersion values along the transmission line for the central frequencies of the optical pulses propagating through each DDF 3 do not increase, so there is no need to increase the mean zero-dispersion wavelength of the optical fibers along with the transmission distance, as is necessary in the embodiment of FIG. 1.

In the present embodiment, acousto-optic modulators are used as the optical frequency shifters 6, but it is also possible to form the optical frequency shifters using phase modulators driven by sawtooth voltages so as to apply frequency shifts which are integer multiples of $2\pi$ (see Reference 6: K. K. Wong et al., "*Performance of a Serrodyne Optical Frequency Translator*", Topical Meeting on Integrated and Guided-Wave Optics, WA5, Pacific-Globe, California, January 1982), of SSB (single sideband) optical frequency modulators (see Reference 7: B. Desormiere et al., *IEEE J. Lightwave Technol.*, 8, pp. 506–513 1990) instead of acousto-optic modulators.

Figure 7:
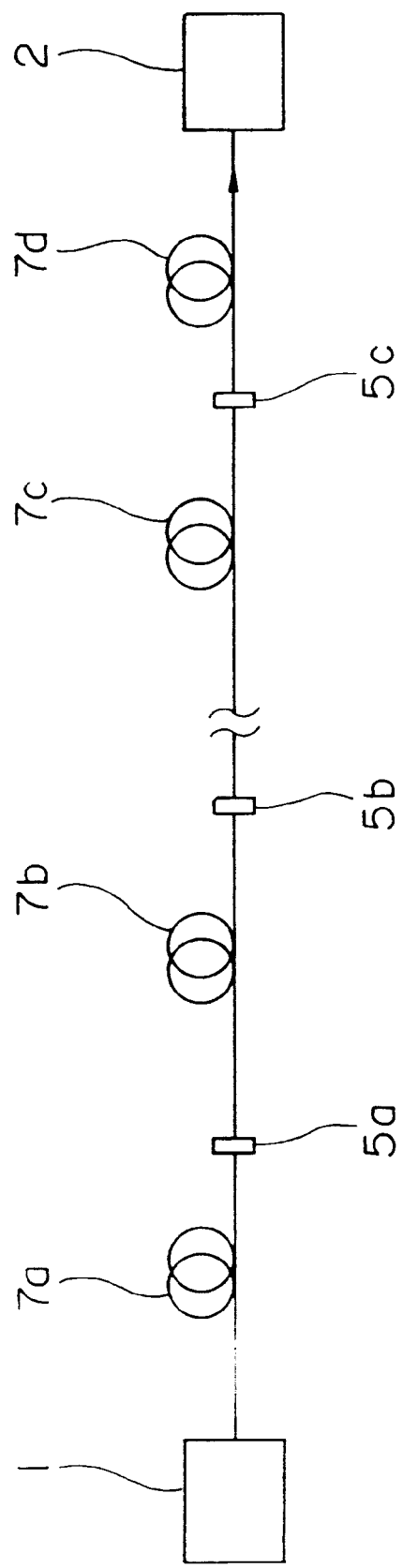
FIG. 7 is a diagram for explaining a third embodiment according to the present invention.

FIG. 7 is a diagram for explaining a third embodiment of the present invention, wherein transmission circuits formed by connecting, in the following order, distributed optical amplifying fibers 7a–7d and optical filters 5a–5c, in multiple stages so as to form a multiply amplified transmission system. The distributed optical amplifying fiber 7 has gain in the direction of propagation. Therefore, optical amplifiers are unnecessary. The optical fibers 7a–7c which are connected sequentially are adjusted so that the mean zero-dispersion wavelengths increase with the transmission distance. The central frequencies of the optical filters 5a–5c are made to down-slide with the transmission distance. While the pulses are compressed using DDFs 3a–3d (see FIG. 2H) in the embodiment of FIG. 1, the present embodiment is different in that the pulses are compressed by using distributed optical amplifying fibers 7a–7d (see FIG. 2I). However, they are similar in that the waveform degradation of the optical pulses due to dispersion and nonlinearity is largely suppressed and timing jitter due to the optical soliton effect is largely reduced, so as to allow the transmission distance to be increased. Additionally, in the embodiment of FIG. 7, the pulse widths of the optical signals outputted from each distributed optical amplifying fiber 7 are made less than the pulse width at the input, and the spectral widths of the optical signals outputted from the distributed optical amplifying fibers 7 are made larger than the spectral widths at the input, by setting the properties such that at least one of the following conditions (I) and (II) are satisfied.

(I) The amplification in each amplifier spacing is increased in the direction of propagation (adiabatic soliton compression).

(II) The peak power $P_0$ of the optical signal inputted to the optical fiber should be greater than the peak optical power (the optical power required to form a fundamental soliton: the soliton power) defined as follows:

$$P_0 = 0.776(\lambda^3 A_{eff}/\pi^2 c n_2)D/\tau^2$$

wherein $\lambda$ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and $\tau$ is the pulse width of the optical signal.

When only the condition (I) is to be fulfilled, the power of the optical signal inputted to the optical fiber should be made equal to the peak optical power expressed by the peak power $P_0$ of the above formula. On the other hand, when only the condition (II) is to be fulfilled, the amplification in each DDF in the direction of propagation should be made constant.

Figure 8:
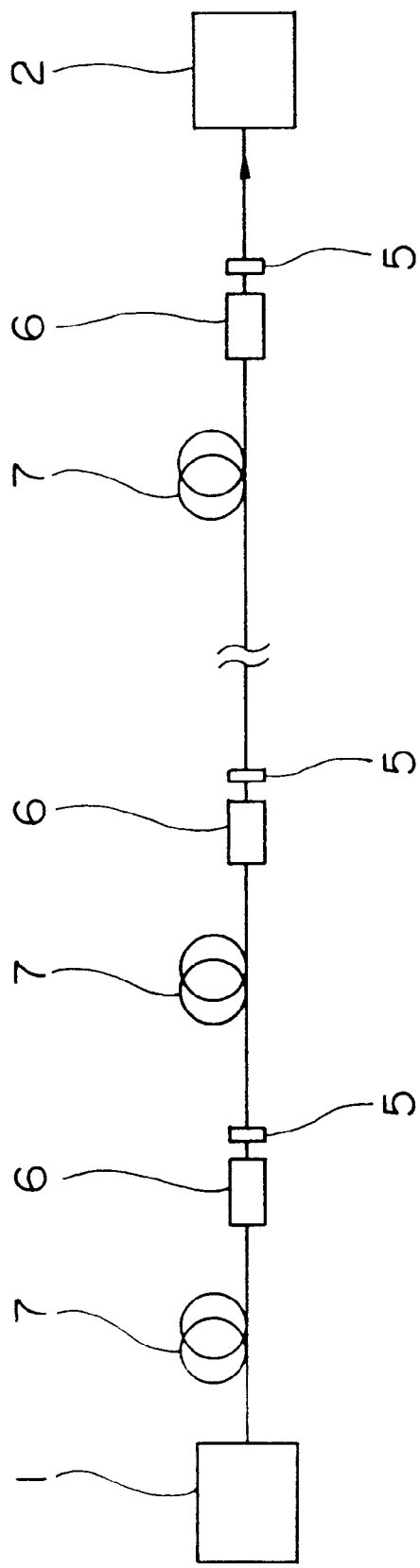
FIG. 8 is a diagram for explaining a fourth embodiment according to the present invention.

FIG. 8 is a diagram for explaining a fourth embodiment of the present invention, wherein transmission circuits are formed by connecting, in the following order, a distributed optical amplifying fiber 7, an optical frequency shifter 6 and an optical filter 5, and these transmission circuits are connected in multiple stages to form a multiply amplified transmission system. In the example of FIG. 7, the central frequencies of the optical filters 5a–5c are down-slid with the transmission distance, and the mean zero-dispersion wavelengths of the optical fibers 7a–7d are made to sequentially increase with the transmission distance. In contrast, the present embodiment differs in that the frequencies are up-shifted by using optical filters 5 with fixed central frequencies and optical frequency shifters 6 composed of acousto-optic modulators and the like for shifting the frequencies to higher frequencies. However, they are similar in that the waveform degradation of the optical pulses due to higher order dispersion and nonlinearity is largely suppressed and timing jitter due to the optical soliton effect is largely reduced, so as to allow the transmission distance to be increased.

In the present embodiment, the frequency sliding is performed by mean of optical filters 5 with fixed central frequencies and optical frequency shifters 6, so that the central frequencies of the transmitted optical pulses are fixed to the central frequencies of the optical filters 5, and are therefore constant with respect to the transmission distance. Hence, the dispersion values of the transmission path sensed by the optical pulses do not increase, and there is no need for the mean zero-dispersion wavelengths of the optical fibers 7a–7d to increase with the transmission distance as with the third embodiment shown in FIG. 7.

While possible embodiments of the present invention have been explained with reference to the drawings, the present invention can be realized in various other forms as long as they do not contradict the gist and main features of the present invention. Thus, the above-described embodiments are merely examples for explaining aspects of the invention, and should not be interpreted in any restrictive manner. The scope of the present invention is as indicated by the claims, and is in no way bound to the descriptions in the specification. Furthermore, any modifications or changes which belong within the scope of the claims under application of the Doctrine of Equivalents also lie within the scope of the present invention.

We claim:

1. An optical transmission line comprising:
   a plurality of transmission circuits each having, connected in the following order, an optical fiber with a dispersion value that decreases in the longitudinal direction, an optical amplifier, and an optical filter; wherein
   the dispersion decrease in each fiber and the amplification of each optical amplifier is set for each of said transmission circuits such as to result in a predetermined optical pulse width;
   the central frequencies of the optical filters are made to sequentially slide toward lower frequencies along the direction of propagation; and
   the mean zero-dispersion wavelengths of the optical fibers are made to sequentially increase in the direction of propagation.

2. An optical transmission line in accordance with claim 1, wherein the pulse widths of the optical signals outputted from each of the optical fibers are made smaller than the pulse widths when inputted, and the spectral widths of the optical signals outputted from each of the optical fibers are made larger than the spectral widths when inputted, by setting the dispersion decrease in each optical fiber and the amplification of each amplifier such as to satisfy the conditions that:
   (a) the dispersion decrease in each of the optical fibers is set to be greater than the power attenuation of the optical signals propagating through the optical fiber; and
   (b) the peak power $P_0$ of the optical signals inputted to the optical fiber is such that:

$$P_0 = 0.776(\lambda^3 A_{eff}/\pi^2 c n_2)D/\tau^2$$

wherein $\lambda$ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and $\tau$ is the pulse width of the optical signal.

3. An optical transmission line in accordance with claim 1, wherein the pulse widths of the optical signals outputted from each of the optical fibers are made smaller than the pulse widths when inputted, and the spectral widths of the optical signals outputted from each of the optical fibers are made larger than the spectral widths when inputted, by setting the dispersion decrease in each optical fiber and the amplification of each amplifier such as to satisfy the conditions that:

(a) the dispersion decrease in each of the optical fibers is set to be equal to the power attenuation of the optical signals propagating through the optical fiber; and (b) the peak power $P_0$ of the optical signals inputted to the optical fiber is such that:

$$P_0 > 0.776(\lambda^3 A_{eff}/\pi^2 c n_2)D/\tau^2$$

wherein $\lambda$ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and $\tau$ is the pulse width of the optical signal.

4. An optical transmission line in accordance with claim 1, wherein the pulse widths of the optical signals outputted from each of the optical fibers are made smaller than the pulse widths when inputted, and the spectral widths of the optical signals outputted from each of the optical fibers are made larger than the spectral widths when inputted, by setting the dispersion decrease in each optical fiber and the amplification of each amplifier such as to satisfy the conditions that:

(a) the dispersion decrease in each of the optical fibers is set to be greater than the power attenuation of the optical signals propagating through the optical fiber; and (b) the peak power $P_0$ of the optical signals inputted to the optical fiber is such that:

$$P_0 > 0.776(\lambda^3 A_{eff}/\pi^2 c n_2)D/\tau^2$$

wherein $\lambda$ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and $\tau$ is the pulse width of the optical signal.

5. An optical transmission line in accordance with claim 1, wherein said optical fibers are optical fibers which have been made such that their dispersion values gradually decrease in the direction of propagation.

6. An optical transmission line in accordance with claim 1, wherein said optical fibers are formed by connecting together a plurality of optical fibers having different dispersion values such that the dispersion values gradually decrease in the direction of propagation.

7. An optical transmission line comprising:

a plurality of transmission circuits each having, connected in the following order, an optical fiber with a dispersion value that decreases in the longitudinal direction, an optical amplifier, an optical frequency shifter, and an optical filter, wherein the dispersion decrease in each fiber and the amplification of each optical amplifier is set for each of said transmission circuits such as to result in a predetermined optical pulse width and a central frequency of the each optical filter is fixed; and the optical spectra of the optical signals output from each of said plurality of optical frequency shifters are shifted to frequencies higher than the optical spectra of the optical signals when input.

8. An optical transmission line comprising:

a plurality of transmission circuits each having, connected in the following order, an optical fiber which is a distributed optical amplifier having a gain in the direction of propagation, and an optical filter; wherein the central frequencies of the optical filters are made to sequentially slide toward lower frequencies along the direction of propagation; and the mean zero-dispersion wavelengths of the optical fibers are made to sequentially increase in the direction of propagation.

9. An optical transmission line in accordance with claim 8, wherein the pulse widths of the optical signals outputted from each of the optical fibers are made smaller than the pulse widths when inputted, and the spectral widths of the optical signals outputted from each of the optical fibers are made larger than the spectral widths when inputted, by setting the amplification of each amplifier such as to satisfy the conditions that:

(a) the amplification in each amplifier spacing is made to sequentially increase in the direction of propagation; and (b) the peak power $P_0$ of the optical signals inputted to the optical fiber is such that:

$$P_0 = 0.776(\lambda^3 A_{eff}/\pi^2 c n_2)D/\tau^2$$

wherein $\lambda$ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and $\tau$ is the pulse width of the optical signal.

10. An optical transmission line in accordance with claim 8, wherein the pulse widths of the optical signals outputted from each of the optical fibers are made smaller than the pulse widths when inputted, and the spectral widths of the optical signals outputted from each of the optical fibers are made larger than the spectral widths when inputted, by setting the amplification of each amplifier such as to satisfy the conditions that:

(a) the amplification in each amplifier spacing is made constant in the direction of propagation; and (b) the peak power $P_0$ of the optical signals inputted to the optical fiber is such that:

$$P_0 > 0.776(\lambda^3 A_{eff}/\pi^2 c n_2)D/\tau^2$$

wherein $\lambda$ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and $\tau$ is the pulse width of the optical signal.

11. An optical transmission line in accordance with claim 8, wherein the pulse widths of the optical signals outputted from each of the optical fibers are made smaller than the pulse widths when inputted, and the spectral widths of the optical signals outputted from each of the optical fibers are made larger than the spectral widths when inputted, by setting the amplification of each amplifier such as to satisfy the conditions that:

(a) the amplification in each amplifier spacing is made to sequentially increase in the direction of propagation; and (b) the peak power $P_0$ of the optical signals inputted to the optical fiber is such that:

$$P_0 > 0.776(\lambda^3 A_{eff}/\pi^2 c n_2)D/\tau^2$$

wherein λ is the optical signal wavelength, $A_{eff}$ is the effective core area of the optical fiber, c is the velocity of light in a vacuum, $n_2$ is the nonlinear coefficient of the optical fiber, D is the dispersion value at the input end of the optical fiber and τ is the pulse width of the optical signal.

12. An optical transmission line comprising:

a plurality of transmission circuits each having, connected in the following order, an optical fiber which is a distributed optical amplifier having again in the direction of propagation, an optical frequency shifter, and an optical filter, wherein the dispersion decreases in each fiber and the amplification of each optical amplifier is set for each of said transmission circuits such as to result in a predetermined optical pulse width and the central frequency of the each optical filter is fixed; and the optical spectra of the optical signals output from each of said plurality of optical frequency shifters are shifted to higher frequencies than the optical spectra of the optical signals when input.

13. An optical transmission system comprising:

an optical transmitter;

an optical transmission line in accordance with any one of claims 1–12 connected to said optical transmitter; and an optical receiver connected to said optical transmission line.

* * * * *

UNITED STATES PATENT AND TRADEMARK OFFICE
CERTIFICATE OF CORRECTION

PATENT NO. : 5,986,789
DATED : November 16, 1999
INVENTOR(S) : Shingo Kawai et al.

It is certified that error appears in the above-identified patent and that said Letters Patent is hereby corrected as shown below:

Column 10,
Line 35, "is" should read --are--.

Column 11,
Line 60, "is" should read --are--.

Signed and Sealed this

Thirty-first Day of July, 2001

Attest:

*Attesting Officer*

NICHOLAS P. GODICI
*Acting Director of the United States Patent and Trademark Office*